United States Patent [19]

Carroll, Jr. et al.

[11] Patent Number: 5,479,192
[45] Date of Patent: Dec. 26, 1995

[54] MULTIFUNCTION SPACE BAR FOR VIDEO SCREEN GRAPHICS CURSOR CONTROL

[76] Inventors: George L. Carroll, Jr., 16 E. Olive St., Arlington Heights, Ill. 60004; Michael A. Slavin, 4440 PGA Blvd., Ste. 402, Palm Beach Gardens, Fla. 33410

[21] Appl. No.: 656,573

[22] Filed: Feb. 15, 1991

[51] Int. Cl.$^6$ ........................................................ G09G 3/02
[52] U.S. Cl. ........................................... 345/168; 345/157
[58] Field of Search ........................................ 340/709, 706, 340/710, 711; 74/471 XY, 471; 273/148 B; 341/23, 22; 400/472, 473; 345/168, 169, 170, 171, 157, 156, 160, 163, 167, 184

[56] References Cited

U.S. PATENT DOCUMENTS

| | | | |
|---|---|---|---|
| 4,680,577 | 7/1987 | Straayer et al. | 340/709 |
| 4,712,101 | 12/1987 | Culver | 340/710 |
| 4,799,049 | 1/1989 | Avila | 340/709 |
| 4,823,634 | 4/1989 | Culver | 340/710 |
| 4,896,554 | 1/1990 | Culver | 74/471 |
| 4,937,564 | 6/1990 | Oberg | 340/706 |
| 5,049,863 | 9/1991 | Oka | 340/709 |

OTHER PUBLICATIONS

Byte, Feb. 1991 Touch & Feel Interfaces, Reinhardt.
PC Week, Mar. 1991 Five New Touch Pad Devices, Boudette.
PC World, May 1991 Fingertip Mouse Control, Susan Lusty.
PC Week, Mar. 1991 Microsoft's BallPoint Mouse, Methvin.

*Primary Examiner*—Richard Hjerpe
*Assistant Examiner*—Xiao M. Wu
*Attorney, Agent, or Firm*—McHale & Slavin

[57] ABSTRACT

A multifunction space bar for control of a video screen graphics cursor for replacement of, or as a supplement to, a second peripheral pointing device without keyboard modification. The device is a conventional space bar replacement and fits within the confines of conventional keyboards allowing the retro-fit of existing keyboards. The device is capable of supplying information signals determining rotational, sliding, and switch depression movements for control of video screen graphics cursor on a microprocessor based computer system having bus input control electronics for receipt of supply information signals. The device utilizes a positioner slidably secured to a cylindrical bar whereby rotation of the positioner generates a directional signal control of the graphic cursor along the y-axis. Slidable movement of the positioner longitudinally along the length of the cylindrical bar generates a directional signal for control of the graphic cursor along the x-axis. Both signals can be operated simultaneously. A plurality of switches are placed on the front of the device's support structure providing mouse button emulation and disabling/enabling for operation as a supplemental device.

12 Claims, 2 Drawing Sheets

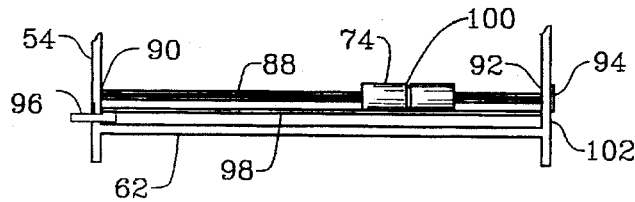
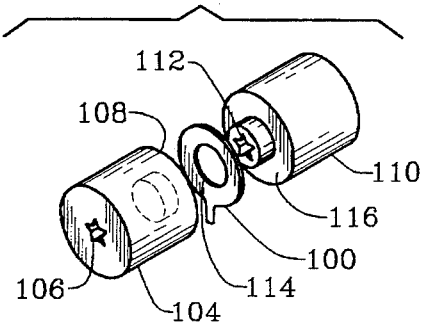
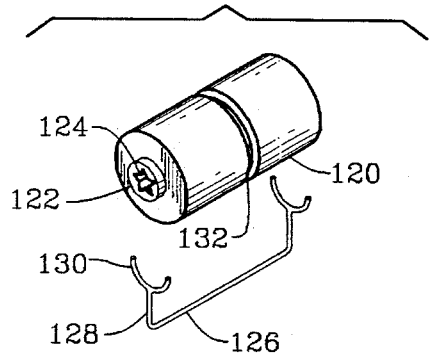
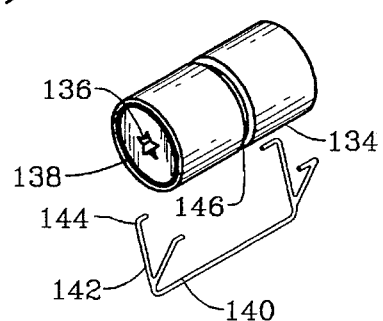
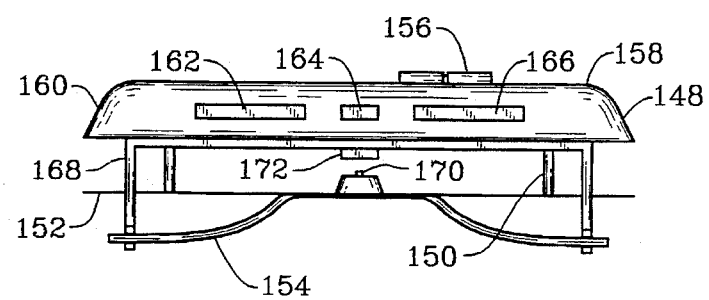
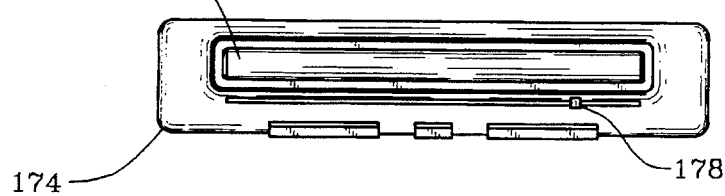

MULTIFUNCTION SPACE BAR FOR VIDEO SCREEN GRAPHICS CURSOR CONTROL

FIELD OF THE INVENTION

The present invention relates generally to microprocessor based computer systems capable of video screen graphics cursor control and, more particularly, is directed to a new improved space bar designed to fit computer keyboards with minimal, if any, modification wherein the improved space bar is capable of conventional video screen cursor control in addition to a multifunction capability of controlling a video screen graphics cursor.

BACKGROUND OF THE INVENTION

A micro-processor based computer system has the unquestionable ability to manipulate data. Depending on the particulars of software development, manipulation can be internal as well as visually displayed for external control. Visual display is further exploited for interactive user collaboration whereby a means for changing the visual aspects of the display is employed. One such means is cursor control. The most recognized type of cursor control device being the "space bar," a term derived from the extensive use of typewriter-like keyboards for data processing. Data processing with a computer allows the use of advanced cursor control for cursor movement one character left, right, up, or down at a time. As the value of cursor control became evident, computer keyboard manufacturers provided a separate set of arrow keys designated for "manipulation" or "positioning" instead of "control."

Simple cursor control soon became inadequate as a need developed to quickly relocate the cursor with minimum key strokes. The inability to move the cursor quickly, accurately, or diagonally impeded software development. To overcome this limitation, a peripheral device called a "mouse" was created which disregarded the use of keyboard strokes and used a graphics cursor to enhance the methodology of the common cursor. As described in U.S. Pat. No. 4,801,931 by Schmidt, a single trackball is used to turn x and y axis rotational inputs, or both inputs simultaneously. By use of the mouse device, software programs have the flexibility to incorporate graphic cursor functionality into their design. For instance, a mouse allows an operator to "drag" an object across a video screen by first moving the graphic cursor to the object, depressing a mouse switch and dragging the object to any section on the screen. Thus, the conventional cursor was not displaced but enhanced by the graphic cursor allowing complex keyboard operations to be replaced by coordinated cursor positioning with a mouse.

Despite the advantages provided by the graphic cursor, the typical graphic positioner or mouse device remains an external peripheral device. The most efficient means for inputting data into a computer remains the touch typist operator and, despite the use of a mouse for graphic cursor positioning and data manipulation, any time a computer operator is required to remove a hand from the keyboard the operator's efficiency obviously decreases. In addition, the use of a mouse requires additional workspace as well as a special surface for optimum performance.

Portable computer manufactures must address these problems in an effort to retain the true portable nature of their computers. To provide video screen graphic cursor pointing, portable computers require either an external peripheral device, such as a mouse, or extensive keyboard modifications. When using an external peripheral device, the "portability" of a portable computer is considerably degraded. Attachment devices have been developed, or variations thereof eg. joystick, inverted ball, etc. . . , and are currently on the market. U.S. Pat. No. 4,799,049 by Avila and U.S. Pat. No. 4,937,564 by Oberg incorporate rotational and sliding movements into a keyboard embedded device for mouse emulation, yet still require a hand to be removed from the keyboard to operate the graphics cursor positioner. U.S. Pat. No. 4,823,634 by Culver directly addresses the problems associated with removal of the hand from the keyboard by utilizing thumb dexterity for control of a video screen graphic cursor. However, Culver is a keyboard embedded device and as such requires extensive modification to the keyboard. Further, such keyboard embedded devices do not address the optional usage of a co-resident, external video screen graphics cursor pointing device. Such a scheme would allow the user to employ either the keyboard embedded device or an external device, for graphics cursor positioning. Keyboard embedded devices are prone to accidental or inadvertent contact with the operators hand or wrist due to their position on the keyboard and provide no means for preventing the unintended operator contact. Further, the aforementioned devices do not address the inefficient use of the space bar, a carryover from manual typewriters.

The problems described are those which plague the use of graphic cursor control devices. While extensive efforts have been made toward resolving these problems, no satisfactory solution has heretofore been provided. Our invention is specifically designed to overcome the aforementioned problems and further provide a base for future software development needs. It is, therefore, to the effective resolution of these problems that the present invention is directed.

SUMMARY OF THE INVENTION

The principle object of the present invention is to provide a simple and reliable device or apparatus which overcomes the problems previously mentioned when using a graphic cursor control device.

The device is a multifunction space bar which operates in a fashion similar to that of a conventional space bar, but includes the additional functions of x-y axis graphic cursor control. The device is capable of supplying information signals determining rotational, sliding, and switch depression movements for control of video screen graphics cursor on a microprocessor based computer system having bus input control electronics for receipt of supply information signals. In addition, the multifunction space bar, hereinafter referred to as the "mouse bar" includes a plurality of function keys for mouse button emulation and future applications.

The mouse bar utilizes a positioner slidably secured to a cylindrical bar whereby rotation of the positioner generates a directional signal control of the graphic cursor along the y-axis. Movement of the positioner longitudinally along the length of the cylindrical bar generates a directional signal for control of the graphic cursor along the x-axis.

The mouse bar replaces a conventional space bar either as a new or after-market device. The device resembles a conventional space bar with two end surfaces, a front, top, and back surface. However, unlike the conventional space bar, a section of the mouse bar's top surface is removed. Positioned within the mouse bar structure is a rotatively movable elongated, striate, grooved or slotted cylindrical roller bar made from steel, plastic or other rigid material. The cylindrical roller bar rotates 360 degrees on frictionless bearings. At one end of the cylindrical roller bar is mounted a first motion detector output means operable by the rotatable movement of the cylindrical bar whereby the first motion detector supplies information signals to bus input control electronics for manipulation of the graphic cursor along the y-axis of a micro-processor based computer system.

A sleeve, hereinafter referred to as the "positioner" encompasses the cylindrical bar and is slidably secured to the cylindrical bar making it rotatively movable in unison with the cylindrical bar but capable of sliding the length of the bar with desirable resistance. The outer diameter of the positioner provides a surface area allowing an operator to rotate the positioner in unison with the cylindrical bar or slide it along the length of the cylindrical bar. The positioner surface becomes the control surface in a similar fashion as the contact point on a trackball. The inner diameter of the positioner has matching grooves or slots to the cylindrical bar with a critical tolerance dependent upon the type of positioner/cylindrical material composition with the primary purpose of preventing a lead lag situation during rotation due to lose tolerances. The slots or grooves mating the bar and positioner are of such smoothness and tolerance that the positioner is able to slide along the length of the bar with desirable resistance.

The positioner can be a single or multiple piece device as later described with a second motion detector output means operable by the longitudinal movement of the positioner whereby the second motion detector supplies information signals to bus input control electronics for manipulation of the graphic cursor along the x-axis of a micro-processor based computer system. Although other means for triggering a second motion detector are available such as described by U.S. Pat. No. 4,928,093 by Rahman, the present invention includes a means that is inexpensive to manufacture while providing second motion detector control. Location of the second motion sensing device at the opposite end of space bar from the first motion sensing device balances the weight distribution. By rotating the positioner and sliding it at the same time, both analog inputs are generated simultaneously creating a diagonal movement of the cursor.

A plurality of switches are mounted on the front or ends of the mouse bar structure for mouse button toggling in a similar fashion as those used by a mouse. Locating the switches on the front of the mouse bar structure provides preferred stability and operator convenience. Toggling on the front of the mouse bar structure reduces or eliminates accidental depression of the space bar and associated toggling of the space bar switch. In addition it is recommended that one toggle be used as a centering toggle for the purpose of placing the graphic cursor along the y-axis by a single touch, similar to a home key. Further, the desirable operation of a center toggle switch includes an ability to turn the power to the mouse bar's graphic cursor controller on or off without disrupting the normal function of the space bar switch. This type of operation allows an operator to determine the graphic cursor position with the mouse bar while maintaining the touch typist stance, or to optionally disable the mouse bar's cursor positioning capability and to employ, as desired, another pointing device for cursor positioning. The preferred operation of the graphic cursor along the x-axis is best served when the horizontal pixel width of the video display screen is entirely mapped within the range of longitudinal positioner motion.

Accordingly, it is an object of the present invention to provide a graphic cursor control device that will fit within the confines of a conventional keyboard space bar location.

Another object of the present invention is to provide a means to simultaneously rotate and slide a graphic cursor positioner to simultaneously activate x and y axis output devices.

Still another object of the present invention is to provide a plurality of switching toggles on a surface of the mouse bar which avoids space bar depression when applying force to said switches.

Yet another object of the invention is to designate a switch for powering the graphic cursor control portion of the mouse bar thus disabling or enabling the multifunction capability of the mouse bar.

Yet another object of the invention is to provide a replacement, or supplement, to external mouse devices.

Yet still another object of the instant invention is to provide a switch capable of Y-axis graphic cursor centering to avoid reverse thumb rolling.

Still another object of the instant invention is to provide a positioner capable of slidable movement along the longitudinal length of a cylindrical bar as well as rotatable movement of said cylindrical bar at any location of the positioner along said cylindrical bar.

Still another object of the instant invention is to provide a location for additional switches for future programming usage at a location that does not require movement of either hand from the preferred touch typist stance.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE DRAWINGS

FIG. 5 is an internal component view of the mouse bar illustrating the positioner and roller bar support;

FIG. 6 is an exploded view of the multi-piece positioner;

FIG. 7 is an exploded view of a second type of positioner using a U-shaped cradle;

FIG. 8 is an exploded view of a third type of positioner using a V-shaped cradle;

FIG. 9 is another embodiment of the invention using a fixed positioner;

FIG. 10 is another embodiment of the invention using independent x an y positioners.

DETAILED DESCRIPTION OF THE INVENTION

As required, detailed embodiments of the present invention are disclosed herein, however, it is to be understood that the disclosed embodiments are merely exemplary of the invention which may be embodied in various forms. Therefore, specific functional and structural details disclosed herein are not to be interpreted as limiting, but merely as a basis for the claims and as a representative basis for teaching one skilled in the art to variously employ the present invention in virtually any appropriately detailed structure.

Figure 1:
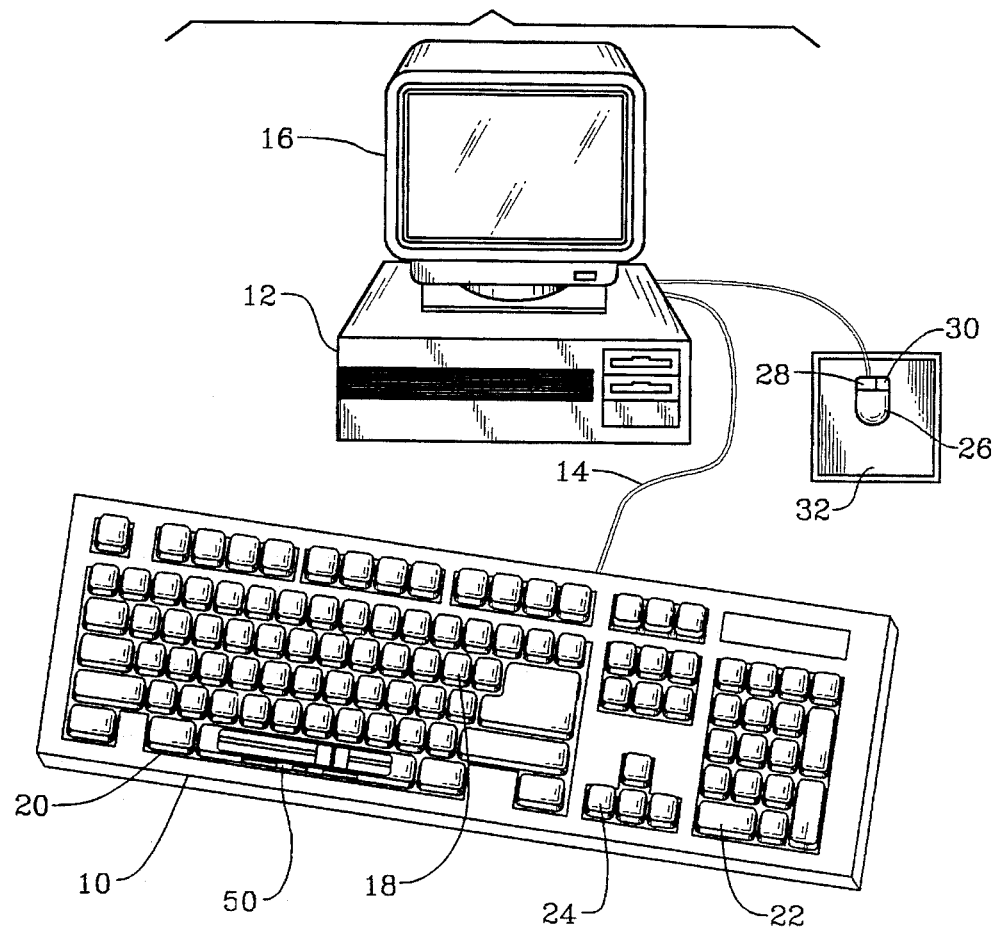
FIG. 1 is a perspective view of a typical computer system with a periperal mouse and the mouse bar occupying the traditional space bar location.

Referring now to the drawings, particularly to FIG. 1 in which a typical desktop computer is illustrated showing a conventional keyboard support structure 10 coupled to a processing unit 12 by cable 14. Video screen 16 provides a visual display of keyboard instructions or manipulated data. The mouse bar 50 is situated within type key section 18 with due notice given that the mouse bar fits within the confines of the keyboard framus opening 20 without modification of the keyboard support structure 10. Common cursor directional keys are shown as dual function arrow keys 22 and specific function arrow keys 24.

The mouse bar 50 operates as a conventional space bar but includes x-y axis graphic cursor control functions typically found on a peripheral mouse device 26 shown with left toggle switch 28, a right toggle switch 30, and a non-slip surface pad 32 for optimum trackball traction. It should be noted that the instant invention is not limited to a desktop computer system and may work on any computer system using a space bar including the shortened space bars found on laptop or notebook computers, as a supplement as well as the stated replacement of the peripheral mouse device.

Figure 2:
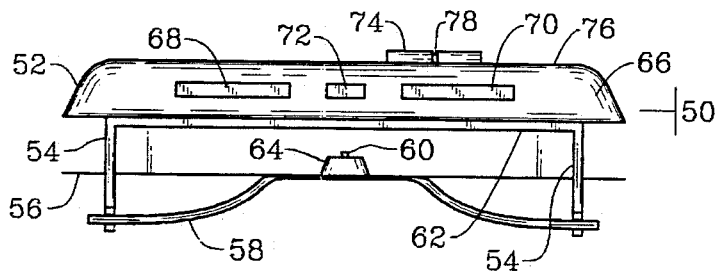
FIG. 2 is a front view of the mouse bar removed from the keyboard.

As illustrated by FIG. 2, the mouse bar is a direct replacement for conventional space bars either as a new product or for retro-fitted keyboards. The apparatus resembles a conventional space bar using a hollow support structure 52. End supports 54 extrude through a conventional keyboard baseplate 56 and attaches to a conventional torsion bar 58. Torsion bar 58 secures the mouse bar in position and ensures even toggling of conventional space bar switch 60 whether the left or right side of the mouse bar is depressed. In one method of manufacture of the mouse bar it has been found that a triggering rod 62 between supports 54 allows for switch 60 toggling thereby preventing modification of the switch 60 or conventional placement thereof. Despite the variety of keyboard manufacturers and torsion bar design, the supports 54 can be readily adapted to any keyboard design. Further modification of the support will not defeat the object of this invention. Rubber depression cushion 64 is placed over the spacebar switch 60 to provide an industry acceptable toggle feel or the cushion 64 can be placed around each support 54 thereby permitting the use of heavier components for mouse bar design using the depression cushion 64 as support. The front surface 66 of the mouse bar 50 faces the operator and houses a plurality of toggling switches as partially illustrated. Left toggle 68 and right toggle 70 emulate left and right mouse buttons. The size of toggle is a function of aesthetics and the number of function switches desired. Toggle depression is desirable to resemble a soft button or firm click action. Locating the switches on the front of the mouse bar structure provides preferred stability and operator convenience. Toggling on the front of the mouse bar structure reduces or eliminates accidental depression of the space bar and associated toggling of the space bar switch. A center toggle 72 has been found to be advantageous as a centering power control toggle. For instance, software programming allows the operator to single click the toggle and cause the graphic cursor to reposition itself in the middle of the y-axis. Double clicking causes the graphic cursor to reposition itself at the bottom of the y-axis. A prolonged depression or concomitant clicking disables the mouse bar's graphic cursor positioning capability leaving the mouse bar's sole operation that of a common space bar. Mouse bar disconnect allows an operator with limited thumb dexterity to use the device as proficiently as a touch typist. Center toggle 72 clicking affects the y-axis positioning only. While the buttons are described as centering and mouse emulation, other functions can be appointed to the switches as determined by the capabilities of the bus input control electronics and related software. A portion of the positioner 74 rises over the top surface 76 of the support structure 66 permitting the operator to know its position without visual sighting, a space 78 in the middle of the positioner 74 further assists in centering determination by feel.

Figure 4:
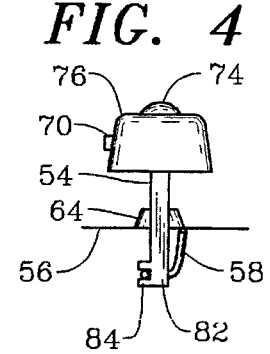
FIG. 4 is a side view of the mouse bar.
Figure 3:
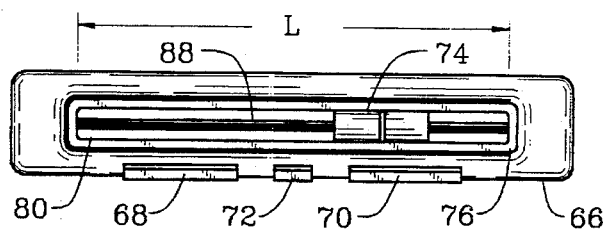
FIG. 3 is a top view of the mouse bar.

The view in FIG. 3 illustrates the top surface 76 of the support structure 66 with a mortise 80 spanning approximately the length L of the top surface 76 with a width between 4 and 15 mm exposing a top surface area of positioner 74. The positioner 74 is free to travel the longitudinal length L of the support structure. The width of the mortise 80 is of such tolerance as to prevent fingers or objects from sliding between the positioner and inside surface opposite top surface 76. The side view of FIG. 4 details the end support 54 utilizing a single bend 82 and coupling section 84 for attaching to existing torsion bar 58 beneath keyboard platform 56. A furcated bend in support 54 will not defeat the object of this invention. The positioner 74 extends slightly above the surface 76 of the mouse bar 50

Now referring to FIG. 5 the cylindrical bar 88 is a rotatively movable elongated striated, grooved or slotted cylindrical roller bar 88 made from steel, plastic or other rigid material between 2 and 10 mm in diameter and is supported on the left side by a limited or frictionless bearing 90 integrated with support bar 54. Polishing of roller bar 88 near the ends of the bar reduce the need for bearing supports allowing a plastic sleeve or similar low friction support. The right side of the roller bar is similarly supported by bearing 92 and includes a means for generating a first output in relation to the rotation movement of said cylindrical bar by use of a direct mechanical connection to an electrical y-axis analog pick-up device 94 such as an Alps switch or similar rotatable device capable of analog output. A preferred method of manufacturer incorporates the roller bar 88 and first output device 94 by directly coupling the roller bar to the first output device utilizing the device's bearings as the right side support.

The positioner 74 is manufactured from plastic, thermal plastic, or similar light-weight material that can retain a defined shape and encompasses the cylindrical bar 88 and is slidably secured to the cylindrical bar making it rotatively movable in unison with the cylindrical bar but allowed to slide the longitudinal length of the bar with minimal resistance. The positioner has an outer diameter between 5 and 15 mm including surface preparation and an inner diameter or aperture of the same size as the matching cylindrical bar with striations, grooves or slots with minimal tolerances to prevent a lead lag situation during rotation. The slots or grooves mating between the bar and positioner are of such smoothness and tolerances that the positioner is able to slide along the length of the bar with minimal resistance. The outer diameter of the positioner provides sufficient surface area to allow an operator to rotate or slide the positioner by use of either thumb with little effort. The positioner includes a means for generating a second output in relation to the longitudinal movement of said positioner by use of a direct mechanical connection to an electrical x-axis analog pick-up device 96 such as an Alps switch or similar rotatable device capable of analog output. The first and second outputs supply information signals for a bus input control electronics for control of the graphics cursor along the x-y axis. By rotating of the positioner and sliding it at the same time, both x and y-axis analog inputs are accessed simultaneously creating a diagonal movement of the cursor. The preferred means for rotation control of the second output device 96 is by direct attachment to the positioner by flexible material 98 such as string, wire, plastic or similar elastic bands. A first end of the material 98 is attached to the positioner non-rotatable section 100 and wraps around a bushing or bearing 102 on the right side of the support 54, wrapping around the second output device 96 with the opposite end of the material 98 attached to a non-rotatable section 100. The placement of the second output device 96 at the opposite end of mouse bar from the first output device 94 balances the weight distribution. By use of dual slots in the left support 54 the second output device can be supported in vertical fashion similar to that as shown by the first output device 94 by use of dead bearings. Triggering rod 62 can be employed as an alignment bar to prevent the non-rotatable section 100 from moving out of position. The preferred operation of the graphic cursor along the x-axis is best served when the horizontal pixel width of the video display screen is entirely mapped within the range of longitudinal positioner motion. Use of two fingers allow mouse dragging by constant depression of a toggle button while the positioner is being moved.

FIG. 6 illustrates one form of positioner manufacture in which the positioner is shown with first portion 104 having a roller bar aperture 106 with enhanced grooves for pictorial purposes and a bore 108. The depth of bore 108 is slightly less than the combined width of non-rotatable section or disc 100 and the length of the second portion 110 and collar 112 leaving a space between first and second portions 104, 110 for non-rotatable section 100 to stabilize within, without undesirable friction. The mortise 114 of non-rotatable section 100 fits over collar 112. It should be noted that correct machining of collar 112, mortise 114 and inner surfaces 116, 118 and the two side surfaces of non-rotatable section 100 is required to prevent the non-rotatable section 100 from spinning with the positioner due to friction. Lack of sufficient machining can be overcome by use of a bearing in place of collar 112. The lower portion of non-rotatable section 100 extends beyond the positioner surface diameter for use in material 98 attachment. The overall diameter of the non-rotatable section is less than the overall diameter of the positioner providing the operator a feel for the center of the positioner by means of a detectable depression while further preventing the operator from touching the non-rotatable section. Although not shown, curvature mouse button emulation switches can be used on either side of the positioner.

Another type of positioner manufacture is illustrated in FIG. 7 in which the positioner 120 is made from a single piece of material with male extension ferrules 122 set on each side of said positioner and an aperture 124 placed through the longitudinal center of said positioner. For activation of the second output device, the non-rotatable section is a cradle formed from a single piece of material with a support structure 126 with axially spaced apart opposite ends 128 having identical profiles with U-shaped free ends 130 being positioned for disposition beneath each ferrule 122 of said positioner. The symmetrical U-shaped attachments 130 secure to the ferrules 122 providing a non-rotatable section for operation of the x-axis positioner. The positioner 120 may also include a depression 132 in the center of its surface for operator convenience.

Yet another type of positioner manufacture is illustrated in FIG. 8 in which a positioner 134 is made from a single piece of material with aperture 134 through the longitudinal center. On each end of the positioner is groove 136. For activation of the second output device, the non-rotatable section is a cradle formed from a single piece of material with a support structure 140 with axially spaced apart opposite ends having identical V-shaped profiles 142 with inwardly directed free ends 144 for insertion into groove 138. The positioner 134 may also include a depression 146 in the center of its surface for operator convenience.

FIG. 9 shows another embodiment of the invention in which the device resembles a conventional space bar using a hollow support structure 148. The positioner and cylindrical rod are similar to that as described in FIG. 5 however, the end supports 150 that extrude through the conventional keyboard baseplate 152 do not attach to conventional torsion bar 154 as in FIG. 5. In this manufacture, horizontal height of the x-y graphic cursor positioner 156 remains fixed on end supports 150 allowing the hollow support structure 148 to be depressed 158 around the positioner 156 on conventional support legs 168. The front surface 160 of the mouse bar faces the operator and may house the toggling switches as partially illustrated by 162, 164, and 166. Although not illustrated, the cylindrical bar remains below the surface of the support structure even in its depressed position to avoid interference with operator space bar toggling. Space bar switch 170 is toggled by cross support 172 in the depressed mode. A center toggling switch is still advantageous as a centering power control toggle but mouse bar disconnect is not needed for the space bar movement will not affect the graphic cursor control unless the device is used as a supplemental pointing device.

FIG. 10 shows a top view of still a further embodiment where the device resembles a conventional space bar using a hollow support structure 174. As previously mentioned the cylindrical rod 176 is used to control the y-axis output device, however, in this embodiment the cylindrical bar is rotated by direct finger contact with the surface of the bar. The positioner in this embodiment is a tab 178 that extends from the top of the support structure on either side of the cylindrical bar and is slidable along the longitudinal length of the cylindrical bar for control of the x-axis output device.

It is believed that a careful consideration of the specification taken in conjunction with the views of the drawing will enable the reader to obtain a clear and comprehensive understanding of the construction, the features and advantages and mode of use. Under the circumstances a more restricted description is deemed to be unnecessary.

It is to be understood that while we have illustrated and described certain forms of the invention, it is not to be limited to the specific forms or arrangement of parts herein describe and shown. It will be apparent to those skilled in the art that various changes may be made without departing from the scope of the invention and the invention is not to be considered limited to what is shown in the drawings and described in the specification.

What is claimed as new and desire to secure by Letters Patent of the United States is:

1. A multifunction space bar occupying the traditional space bar location capable of supplying information signals determining rotational, sliding, and switch depression movements for control of a video screen graphics cursor on a miroprocessor based computer system having bus input control electronics for receipt of supply information signals, said space bar system comprising:

a conventional space bar support structure, said support structure having a front, top, and back surface and first and second ends, said top surface having an elongated slot disposed therein;

a rotatively movable elongated cylindrical bar positioned within the first and second end of said support structure;

a positioner slidably secured to said cylindrical bar and protruding through a portion of the elongated slot, said positioner operatively associated with said cylindrical bar for rotational movement of said cylindrical bar about a horizontal axis along the length of the cylindrical bar;

a plurality of switches mounted on the front of said support structure;

means for toggling a conventional spacebar switch for horizontal cursor movement;

means for generating a first output in relation to the rotatively movement of said cylindrical bar for control of a graphics cursor along an y-axis of the video screen; and means for generating a second output in relation to the longitudinal movement of said positioner along the length of the cylindrical bar for control of a graphic cursor along an x-axis of the video screen, said first and second outputs supply information signals to a bus input control electronics for manipulation of video screen graphics cursor on a microprocessor based computer system.

2. The multifunction space bar of claim 1 wherein rotation of said cylindrical bar used for generating said first output and longitudinal movement of said positioner used for generating said second output can produce first and said outputs simultaneously.

3. The multifunction space bar according to claim 1 wherein said means for generating said first and said second output is by mechanical rotation of an electrical device capable of producing an analog output.

4. The multifunction space bar of claim 1 wherein said positioner is defined as a two part cylindrical sleeve with a first portion and a second portion, the first portion having a collar on one end with an aperture located longitudinally within, the second portion having a bore on one end with an aperture located longitudinally within, and a non-rotatable section encompassing the collar, the collar of the first portion insertable into the bore of the second portion.

5. The non-rotatable section of claim 4 further defined as a flat disc with a mortise for placement over said first portion collar.

6. The multifunction space bar of claim 1 wherein said positioner is defined as a one part cylindrical sleeve with a ferrule located on either end of the sleeve with an aperture located longitudinally within and a non-rotatable section, said non-rotatable section having axially spaced apart opposite ends having identical profiles U-shaped free ends for disposition on each ferrule.

7. The multifunction space bar of claim 1 wherein said positioner is defined as a one part cylindrical sleeve with a groove located on either end of the sleeve with an aperture located longitudinally within and a non-rotatable section, said non-rotatable section having axially spaced apart opposite ends having V-shaped identical profiles with inwardly directed free ends for disposition within the grooves of the sleeve.

8. The multifunction space bar of claim 1 wherein said plurality of switches are mounted on the front surface of said support structure;

9. The switches according to claim 8 further defined as mouse emulation switches and a centering switch, said centering switch capable of enabling/disabling the graphics control portion of the multifunction space bar.

10. The centering switch according to claim 8 wherein one of said switches is capable of y-axis centering of the graphics control cursor.

11. The positioner of claim 1 further defined by a depression located along the outer diameter of said positioner for manual centering.

12. A multifunction space bar occupying the traditional space bar location capable of supplying information signals determining rotational, sliding, and switch depression movements for control of a video screen graphics cursor on a microprocessor based computer system having bus input control electronics for receipt of supply information signals, said space bar system comprising:

a conventional space bar support structure, said support structure having a front, top, and back surface and first and second ends, said support structure having means for bearing support, said top surface having an elongated slot disposed therein;

a rotatively movable elongated, striated, grooved or slotted cylindrical bar positioned within the first and second end of said support structure;

a plastic positioner with an aperture the aperture of said positioner encompassing and slidably secured to said cylindrical bar and protruding through a portion of the elongated slot rotatively movable in unison with said cylindrical bar in combination with a non-rotatable section, said positioner having a depression along an outer surface and operatively associated with said cylindrical bar for rotational movement of said cylindrical bar about a horizontal axis along the length of the cylindrical bar;

a plurality of switches mounted on front of said support structure for mouse button emulation;

means for toggling a conventional spacebar switch for horizontal cursor movement;

means for generating a first output in relation to the rotatively movement of said cylindrical bar for control of a graphics cursor along an y-axis of the video screen; and means for generating a second output in relation to the longitudinal movement of said positioner along the length of the cylindrical bar for control of a graphic cursor along an x-axis of the video screen, said first generating means and said second generating means are simultaneously operable to produce two simultaneous motion signals, said first and second outputs supply information signals to a bus input control electronics for control of video screen graphics cursor on a microprocessor based computer system, said plurality of switches used for mouse button emulation as determined by the capabilities of the bus input control electronics, at least one of said switches disabling the means for generation of said first and second outputs of the cursor control.

* * * * *